(12) United States Patent
Oshino

(10) Patent No.: US 12,370,449 B2
(45) Date of Patent: Jul. 29, 2025

(54) SIMULATION SYSTEM, SIMULATION METHOD, AND SIMULATION PROGRAM FOR CHARACTER OPERATION IN A VIRTUAL SPACE

(71) Applicant: The Pokemon Company, Tokyo (JP)

(72) Inventor: Yosuke Oshino, Tokyo (JP)

(73) Assignee: THE POKÉMON COMPANY, Tokyo (JP)

( * ) Notice: Subject to any disclaimer, the term of this patent is extended or adjusted under 35 U.S.C. 154(b) by 433 days.

(21) Appl. No.: 17/954,363

(22) Filed: Sep. 28, 2022

(65) Prior Publication Data

US 2023/0021105 A1 Jan. 19, 2023

Related U.S. Application Data

(63) Continuation of application No. PCT/JP2020/048747, filed on Dec. 25, 2020.

(30) Foreign Application Priority Data

Mar. 31, 2020 (JP) .................................. 2020-062039

(51) Int. Cl.
    *A63F 13/56* (2014.01)
(52) U.S. Cl.
    CPC .................................... *A63F 13/56* (2014.09)
(58) Field of Classification Search
    CPC .......... A63F 13/56; A63F 13/31; A63F 13/35; A63F 13/822
    See application file for complete search history.

(56) References Cited

U.S. PATENT DOCUMENTS

2007/0060226 A1* 3/2007 Sakaguchi .............. A63F 13/45
                                                              463/1

FOREIGN PATENT DOCUMENTS

| EP | 1082984 A2 | 3/2001 |
| JP | 2001-79269 A | 3/2001 |

OTHER PUBLICATIONS

SmashWiki, "Port priority," Mar. 16, 2011, https://web.archive.org/web/20110316092823/http://www.ssbwiki.com/Port_priority (Year: 2011).*

(Continued)

*Primary Examiner* — Kevin Y Kim
(74) *Attorney, Agent, or Firm* — XSENSUS LLP

(57) ABSTRACT

A user estimates a change in a character's operation in a case where the character is operated in a virtual space by setting one or more commands for a character that is able to be disposed in a virtual space constituted by a plurality of virtual unit spaces and sets the order of execution of the commands. The commands and the order of execution of the commands are set for each of one character and another character, and each of the one character and the other character operates in the virtual space, and in a case where at least parts of an existence position of the one character and an existence position of the other character are common, at least any one of the one character and the other character executes a predetermined operation with preference over an operation based on the set command.

13 Claims, 4 Drawing Sheets

(56) References Cited

OTHER PUBLICATIONS

International Search Report and Written Opinion mailed on Mar. 9, 2021, received for PCT Application PCT/JP2020/048747, filed on Dec. 25, 2020, 8 pages including English Translation.
Written Opinion of the International Searching Authority mailed on Mar. 9, 2021, received for PCT Application PCT/JP2020/048747, filed on Dec. 25, 2020, 3 pages. (Previously filed; submitting English translation only.).

\* cited by examiner

SIMULATION SYSTEM, SIMULATION METHOD, AND SIMULATION PROGRAM FOR CHARACTER OPERATION IN A VIRTUAL SPACE

CROSS-REFERENCE TO RELATED APPLICATIONS

This is a Bypass Continuation of International Application No. PCT/JP2020/048747, filed Dec. 25, 2020, which claims priority to JP 2020-062039, filed Mar. 31, 2020, the entire contents of each are incorporated herein by its reference.

BACKGROUND

Technical Field

The present disclosure relates to a simulation system, a simulation method, and a simulation program. In particular, the present disclosure relates to a simulation system, a simulation method, and a simulation program in which a character operates in a virtual space.

Description of the Related Art

In the related art, there is a known game system that includes at least operation means, arithmetic means, and storage means and in which the arithmetic means proceeds with a game by performing arithmetic calculation based on information input by a player from the operation means, and a game program and data which are stored in the storage means, the game system proceeding with a role playing game and a simulation game in parallel and associating the two games with each other, the role playing game being a game in which the arithmetic means completes a scenario by giving an instruction for an action of a character assigned to a game player, and the simulation game being a game in which the game player creates the game player's own world by editing it arbitrarily (see, for example, PTL 1). According to the game system disclosed in PTL 1, even a game player who has experienced a large number of role playing games can enjoy the game without getting bored because the game player's own world is provided as the world of the role playing game.

CITATION LIST

Patent Literature

[PTL 1] Japanese Patent Application Publication No. 2001-079269

SUMMARY

Technical Problems

However, in the game system disclosed in PTL 1, although a user can set an action of a character, the character acts faithfully according to the setting of the user and the range of action is not limited, and thus it is difficult to make the character's action unexpected. Further, in the game system disclosed in PTL 1, a user has no room to estimate what kind of interaction occurs between a character and another character, an object, or the like.

Thus, an object of the present disclosure is to provide a simulation system, a simulation method, and a simulation program which allow a user to estimate and enjoy a change in a character's operation in a case where the character is operated in a virtual space.

Solutions to the Problems

In order to achieve the above-described object, the present disclosure provides a simulation system including a command setting part that is able to set one or more commands for a character that is able to be disposed in a virtual space constituted by a plurality of virtual unit spaces and sets the order of execution of the commands in a case where the plurality of commands are set, and an operation control part that operates the character in the virtual space based on the commands and the order of execution of the commands which are set for the character, in which the command setting part is able to set the commands and the order of execution of the commands for each of one character and another character, and the operation control part operates each of the one character and the other character in the virtual space, and in a case where at least parts of an existence position of the one character and an existence position of the other character are common, the operation control part causes at least any one of the one character and the other character to execute a predetermined operation with preference over an operation based on the command set by the command setting part.

Advantageous

According to the present disclosure, it is possible to provide a simulation system, a simulation method, and a simulation program which allow a user to estimate and enjoy a change in a character's operation in a case where the character is operated in a virtual space.

DETAILED DESCRIPTION

<Outline of Simulation System 1>

A simulation system 1 according to an exemplary embodiment disposes a character in a virtual space (field) and sets one or more requests desired to be executed by the character in a virtual space and the order of execution of the requests. In addition, the simulation system 1 causes the character to execute a request in accordance with the order of execution in a virtual space. In addition, the simulation system 1 can dispose a plurality of characters in a virtual space and set a request and the order of execution thereof for each of the characters. In addition, the simulation system 1 causes one character and/or another character to execute a predetermined operation together with or with preference over a set request based on a combination of features of the one character and features of the other character or features of a predetermined object or the like in a case where each character is operated in a virtual space, and the one character and the other character, the predetermined object or the like exist at the same position, and/or a request or the like executed by the one character and/or the other character before the one character and the other character, the predetermined object or the like exist at the position.

Further, the simulation system 1 constitutes a virtual space by a plurality of virtual unit spaces. In addition, unique feature can be associated with each virtual unit space. The simulation system 1 can also cause a character to execute a predetermined operation together with or with preference over a set request based on a combination of features of the character and features of a virtual unit space in which the character exists in a case where the character is operated in a virtual space, and/or a request or the like executed by the character before the character exists at the position.

Figure 1:
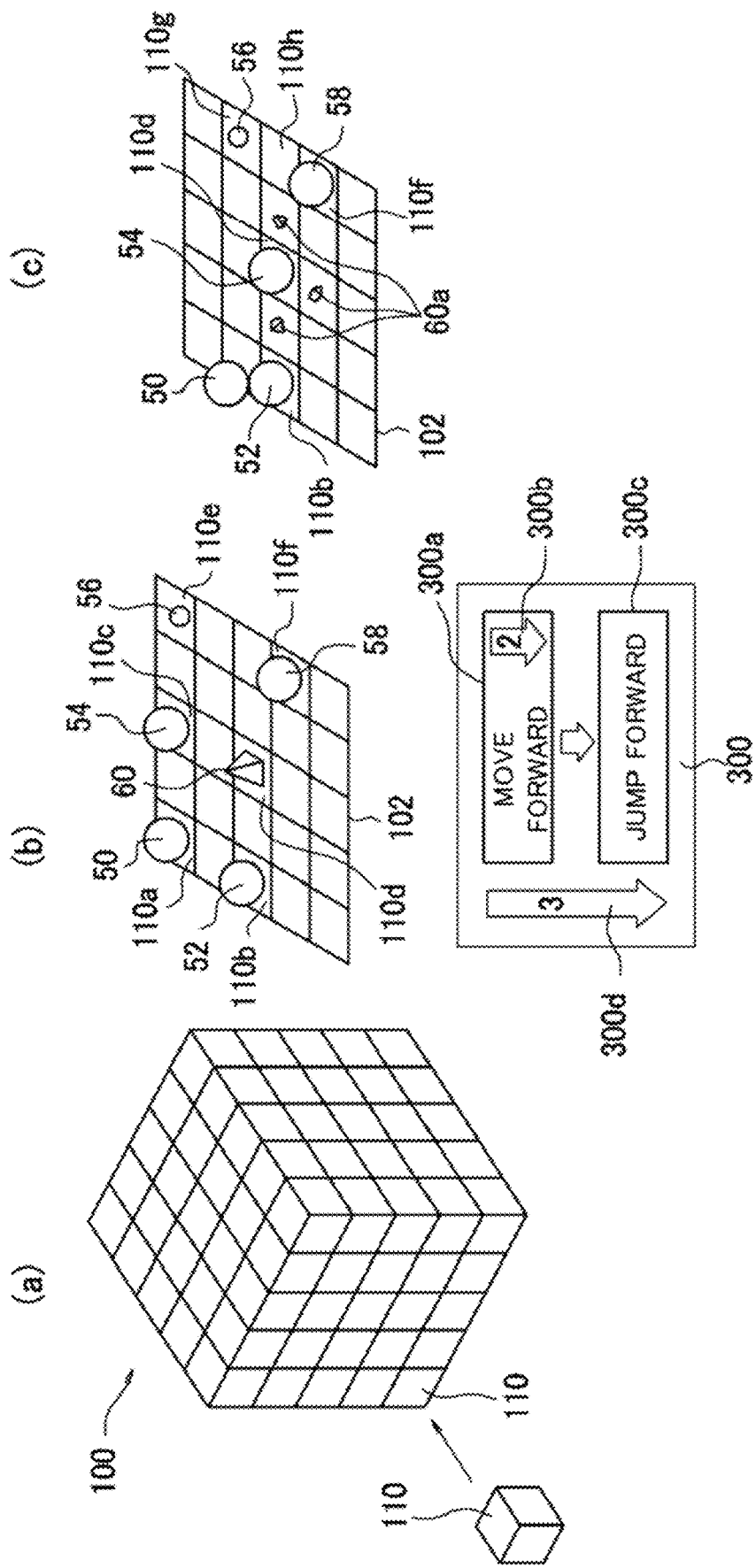
FIG. 1 is a schematic view of a simulation system according to one or more aspects of the present disclosure.

FIG. 1 illustrates an example of an outline of the simulation system according to one or more aspects of the disclosed subject matter.

Specifically, the simulation system 1 is a system that causes a character in a virtual space to execute a predetermined operation based on requests (hereinafter referred to as "commands") and the order of execution of the commands which are set by a user. In addition, the virtual space is constituted by a plurality of constituent units (hereinafter referred to as "virtual unit spaces") connected to each other. As an example, as illustrated in FIG. 1(a), a virtual space 100 is constituted by an aggregate of a plurality of virtual unit spaces 110. FIG. 1(a) illustrates an example in which the plurality of virtual unit spaces 110 each having a cube shape (that is, virtual cubic squares) are assembled to constitute the cubic virtual space 100 (as an example, an example in which the virtual space 100 is constituted by an aggregate of 5×5×5 virtual unit spaces is shown, but the size of the aggregate is not limited thereto; for example, the virtual space may be an aggregate of m×n×o virtual unit spaces; here, m, n, and o are the same or different positive integers). Note that the shape of the virtual space 100 is not limited to a cube shape and may be any shape as long as the shape is an aggregate of the plurality of virtual unit spaces 110. By constituting the virtual space 100 by the virtual unit spaces 110 in this manner, it is possible to designate the movement of a character between the virtual cubic squares (that is, designate the movement in units of the virtual unit spaces 110) and designate a predetermined operation of a character in a cubic square, and thus it is possible to provide the simulation system 1 that is easy to operate regardless of a high degree of freedom in the movement and operation of the character.

In addition, the shape of the virtual unit space 110 is not particularly limited. However, it is preferable that the virtual unit space 110 be configured to have, for example, a cube shape from the viewpoint of securing the ease of configuration of the virtual space 100, or the like. In addition, the plurality of virtual spaces 100 may be connected to each other. Note that the virtual unit space 110 may be configured to have any of other shapes such as a rectangular parallelopiped shape and a spherical shape. In addition, for the virtual unit space 110, a plurality of virtual unit spaces having the same or different shapes may be connected to each other, the connected portions (joint portions) may be treated as nonexistent, and the plurality of connected virtual unit spaces may be treated as one virtual unit space. An example in which the virtual unit space 110 has a cube shape and the virtual space 100 also has a cube shape is described.

First, the simulation system 1 disposes a predetermined character in the virtual space 100 in response to a user's instruction or in advance. As an example, as illustrated in FIG. 1(b), a character 50 is disposed in a virtual unit space 110a, a character 52 is disposed in a virtual unit space 110b, a character 54 is disposed in a virtual unit space 110c, an object 60 is disposed in a virtual unit space 110d, a character 56 is disposed in a virtual unit space 110e, and a character 58 is disposed in a virtual unit space 110f. Here, the character 50, the character 52, and the character 54 are characters of the same type, and the character 56 is a character having a size smaller than that of the character 58. In addition, the object 60 is an object that can be destroyed by the interference of a character. FIG. 1(b) illustrates an example in which a plurality of characters and objects are disposed in the virtual space 100, and the number of characters disposed in the virtual space 100 may be one or more.

Note that, in FIG. 1(b), only lower surfaces of the virtual unit spaces are illustrated for convenience of description (thus, only a lower surface 102 of the virtual space 100 is illustrated in FIG. 1(b)). Thus, the simulation system 1 can install a character or an object not only on the lower surface 102 of the virtual space 100 but also in a virtual unit space above the lower surface 102. Further, in FIG. 1(b), a direction from the virtual unit space 110a to the virtual unit space 110b is called "forward".

Here, the character is a character that can appear in the simulation system 1, and is a character that can be disposed in the virtual space 100 and for which a user can set a command for an operation in the virtual space 100. In addition, the object is an object that can be installed in a predetermined virtual unit space 110 constituting the virtual space 100 in response to a user's instruction, and is an object representing an arrangement or the like that can or cannot be interfered with by a character. In addition, features such as the terrain or weather of the virtual unit space may be set in the virtual unit space 110. Note that the object also includes a character that does not substantially operate in the virtual space 100 or a derived object which is an object associated with the operation of the character, and an environment-specific object (environment object) associated with the terrain, weather, or the like of the virtual unit space 110.

Further, the interference means that one character can have a predetermined influence on another character and/or an object, and/or one character can have a predetermined influence on a predetermined virtual unit space in a case where the one character exists in the same or a nearby virtual unit space as the other character and/or an object, and/or in a case where the one character is in a predetermined virtual unit space or a virtual unit space in the vicinity of the predetermined virtual unit space. Examples of the predetermined influence include various influences. For example, it is possible to set various influences such as an influence of pushing one character to another virtual unit space, an influence of destroying an object in the same virtual unit space, and an influence of changing the state of the virtual unit space.

For example, in FIG. 1(b), a user sets a command for each of the character 50, the character 54, and the character 56. As an example, a command indicating "move forward" (first command) and a command indicating "jump forward" (second command) are set, and the order of execution in which second command is executed after the first command is set for the character 50 and the character 54. In addition, as illustrated in a lower drawing of FIG. 1(b), the first command and the second command are also set for the character

56, and a command 300*d* for repeating an operating of executing a command 300*b* for repeating a first command 300*a* twice and then executing a second command 300*c* as a set three times (that is, a command for repeating an operation of repeating the first command twice and then executing the second command as a set three times) is set. On the other hand, a command is not set for the character 52 or the character 58 (or a "stay" command is set). Note that the object 60 is only disposed in the virtual unit space 110*d*.

Here, the simulation system 1 can output the commands and the order of execution of the commands which are set by the user so that the user can perceive them. For example, the simulation system 1 can be executed in an information terminal, and can display the commands and the order of execution of the commands which are set by the user on a display part of the information terminal, together with or separately from the virtual space 100. For example, the content of the commands and the order of execution of the commands are displayed as a command 300 by using text and a figure illustrated in the lower drawing of FIG. 1(*b*) (in the example of the lower drawing of FIG. 1(*b*), the content of the commands set for the character 56 is displayed). In addition, the simulation system 1 operates a character in the virtual space 100 by executing the command set by the user in the order of execution set by the user.

Note that, in the simulation system 1, after commands and the order of execution of the commands are set for a character, an instruction for changing and stopping an operation of moving from one virtual unit space to another virtual unit space of the character (moving operation) according to a user's instruction is prohibited in principle. However, the simulation system 1 may be able to perform an operation to be executed in a virtual unit space in which a character exists (for example, an operation such as activation of a technique or jumping on the spot) in response to a user's instruction even while the simulation system 1 is executing the operation of the character.

(Examples of Character 50 and Character 52)

For example, as illustrated in FIGS. 1(*b*) and 1(*c*), the character 50 executes the second command after executing the first command. That is, the character 50 moves forward from the virtual unit space 110*a* (executes the first command) and then jumps forward (executes the second command) to reach the virtual unit space 110*b*. Here, in a case where the second command is executed, the character 50 and the character 52 exist in the same virtual unit space 110*b*. In this case, the simulation system 1 controls an operation of the character 50 in the virtual unit space 110*b* based on a combination of features of the character 50 and features of the character 52 and a command immediately before the character 50 reaches the virtual unit space 110*b*. That is, the simulation system 1 controls an operation of the character 50 based on predetermined conditions without depending on (or with preference over) the user's settings.

For example, the simulation system 1 sets, in advance, the execution of an operation of placing one character on another character existing in a virtual unit space in a case where a plurality of characters existing in the same virtual unit space are characters of the same type, and the one character has reached the virtual unit space by "jumping" from a virtual unit space adjacent to the virtual unit space. In addition, since the character 50 and the character 52 are characters of the same type, and the character 50 has executed the second command (a command for jumping forward) immediately before the character 50 reaches the virtual unit space 110*b*, the simulation system 1 operates the character 50 so that the character 50 is placed on the character 52 as illustrated in FIG. 1(*c*). Note that the simulation system 1 can also set, in advance, the execution of an operation in which one character collides with another character existing in a virtual unit space, and the one character stays at the spot (a virtual unit space adjacent to the virtual unit space in which the other character exists) in a case where a plurality of characters existing in the same virtual unit space are characters of the same type, and the one character has reached the virtual unit space of concern by "move forward" from the virtual unit space adjacent to the virtual unit space of concern, an operation in which the one character and the other character are bounced in opposite directions, or the like.

(Examples of Character 54 and Object 60)

In addition, for example, as illustrated in FIGS. 1(*b*) and 1(*c*), the character 54 executes the second command after executing the first command. That is, the character 54 moves forward from the virtual unit space 110*c* (executes the first command) and jumps forward (executes the second command) to reach the virtual unit space 110*d*. Here, in a case where the second command is executed, the character 54 and the object 60 exist in the same virtual unit space 110*d*. In this case, the simulation system 1 controls an operation in the virtual unit space 110*d* of the character 54 based on a combination of features of the character 54 and features of the object 60 and a command immediately before the character 54 reaches the virtual unit space 110*d*.

For example, the simulation system 1 sets, in advance, an operation in which one character can exert a predetermined interference from a character on a predetermined object in a case where the one character and the predetermined object exist in the same virtual unit space. The interference mentioned here indicates that the predetermined object can be destroyed by the character, as an example. In addition, the simulation system 1 sets, in advance, the execution of an operation in which one character destroys an object existing in the virtual unit space of concern in a case where the character has reached the virtual unit space of concern by "jump forward" from a virtual unit space adjacent to the virtual unit space of concern. Then, the character 54 executes the second command (a command for jumping forward) immediately before the character reaches the virtual unit space 110*d*, and thus the simulation system 1 operates the character 54 so that the object 60 is destroyed by the character 54, and a plurality of objects 60*a*, which are broken pieces of the object 60, are scattered around the virtual unit space 110*d* as illustrated in FIG. 1(*c*). Note that, in a case where one character and a predetermined object exist in the same virtual unit space, it is also possible to set, in advance, the execution of an operation in which the one character is flipped by the object and returns to the original virtual unit space without destroying the object existing in the virtual unit space in a case where the character cannot exert a predetermined interference from a character on the predetermined object, and the one character has reached the virtual unit space of concern by "jump forward" or "move forward" from a virtual unit space adjacent to the virtual unit space of concern.

(Examples of Character 56 and Character 58)

Further, for example, as illustrated in FIGS. 1(*b*) and 1(*c*), the character 56 executes the second command after executing the first command twice. That is, the character 56 moves forward by two squares from the virtual unit space 110*e* (executes the first command twice) and then jumps (executes the second command) to reach the virtual unit space 110*f*. Here, in a case where the second command is executed, the character 56 and the character 58 exist in the same virtual unit space 110*f*. In this case, the simulation system 1 controls an operation of the character 56 in the virtual unit space 110*f*, based on a combination of features of the character 56 and features of the character 58 and a command immediately before the character 56 reaches the virtual unit space 110*f*.

For example, in a case where a plurality of characters existing in the same virtual unit space are characters of different types, the size of one character reaching the virtual unit space of concern is smaller than the size of another character that already exists in the virtual unit space of concern, and the one character has reached the virtual unit space of concern by "jumping" from a virtual unit space adjacent to the virtual unit space of concern, the simulation system 1 sets, in advance, the execution of an operation in which the one character collides with the other character existing in a virtual unit space, and the one character is retreated to a virtual unit space behind the original virtual unit space to which the one character has moved. Further, in this case, the simulation system 1 sets, in advance, the execution of an operation while the character having a larger size (in this case, another character) exists in the virtual unit space of concern.

In addition, the character 56 and the character 58 are characters of different types, and the size of the character 58 is larger than the size of the character 56. Consequently, the simulation system 1 executes the second command (a command for jumping) immediately before the character 56 reaches the virtual unit space 110*f*, and thus the simulation system causes the character 56 to be flipped by the character 58 and retreated along the original moving path to return to the virtual unit space 110*g* as illustrated in FIG. 1(*c*). Thereafter, the simulation system 1 causes the character 56 to execute a first operation of the next set because the content of the command set for the character 56 is that a set including two first operations and one second operation is repeated three times.

In this case, the character 56 is positioned in the same virtual unit space as the character 58 in the virtual unit space 110*f* in the second first command. Here, for example, in a case where a plurality of characters existing in the same virtual unit space are characters of different types, the size of one character reaching the virtual unit space of concern is smaller than the size of another character that already exists in the virtual unit space of concern, and the one character has reached the virtual unit space of concern by "move forward" from a virtual unit space adjacent to the virtual unit space of concern, the simulation system 1 sets, in advance, the execution of an operation in which the one character collides with the other character existing in the virtual unit space of concern, and the one character stays in a virtual unit space adjacent to a virtual unit space to which the one character has moved and in which the other character exists. Further, in this case, the simulation system 1 sets, in advance, the execution of an operation while the character having a larger size (in this case, the other character) exists in the virtual unit space of concern. Thus, in this case, the character 56 executes an operation of staying in a virtual unit space 110*h*.

Note that the character and the object may have such a size to occupy the plurality of virtual unit spaces 110. For example, it is possible to use characters and/or objects having various sizes that occupies the plurality of virtual unit spaces 110 such as a character and/or an object having such a size to occupy eight virtual unit spaces 110 of 2×2×2 and a character and/or an object having such a size to occupy four virtual unit spaces 110 of 2×2×1. Further, in this case, the "interference" indicates that one character can have a predetermined influence on another character and/or object, and/or one character can have a predetermined influence on a predetermined virtual unit space not only in a case where one or more virtual unit spaces 110 occupied by one character and/or object and one or more virtual unit spaces 110 occupied by another character and/or object are consistent with each other but also in a case where at least parts thereof are common. For example, in a case where one character occupies the plurality of virtual unit spaces 110, and another character overlaps all or a portion of the plurality of virtual unit spaces 110 (that is, in a case where at least parts of the existence position of one character and the existence position of another character are common), "interference" may occur. Further, in a case where one or more virtual unit spaces 110 occupied by one character and/or object and one or more virtual unit spaces 110 occupied by another character and/or object are consistent with each other, it may be recognized as a special interference, and predetermined interference processing may be executed, unlike a case where parts thereof are common.

In this manner, in the simulation system 1, first, a user can freely set commands for a character and set the order of execution of the commands. Further, in the simulation system 1, the execution of an operation of the character is started in accordance with the commands and the order of execution of the commands which are set by the user, and interference occurs between the character and another character or the like in a predetermined case. In a case where interference has occurred, the simulation system 1 can control an operation to be executed by the character, based on a relationship between the character and another character or the like, the previous operation of the character, or the like.

Note that the virtual space 100 is constituted by the plurality of virtual unit spaces 110, and a character for which a command is set can move from one virtual unit space 110 to another virtual unit space 110 for each virtual unit space. Thus, the occurrence of interference between characters and/or between a character and an object or the like can be controlled for each virtual unit space, and thus the user can easily estimate the occurrence itself of interference (here, the user is not notified of the content of the interference such as what kind of interference occurs, and thus the user cannot easily estimate the occurrence of interference until the interference occurs actually) without strictly controlling a movement command for a character (that is, without strictly setting the determination of a contact between characters or between a character and an object).

That is, in the simulation system 1, the command and/or the order of the command which are set by the user are not necessarily executed according to the user's settings, and various changes occur in an operation of a character in accordance with a combination of features of the character to be disposed in the virtual space 100, features of an object, and/or features of the virtual unit space 110. Thus, according to the simulation system 1, in a case where a plurality of characters are used, the user can execute simulation while examining, assuming, and imagining various operations and changes in the operations such as what kind of character can be used for a certain character to observe an interesting movement or how the operation of a character change depending on an object to be disposed in the virtual space 100. Thereby, in the simulation system 1, the user attempts various combinations of characters, objects, and/or virtual unit spaces, and observe and enjoy the movement of the characters and the movement of the characters in the virtual space 100.

Note that, the simulation system 1 can be realized by an information terminal such as a mobile phone, a smartphone, a laptop computer, a tablet PC, a PC, a portable game machine, and/or a home game machine. In addition, details of the simulation system 1 will be described below. However, names and numerical values in the above description and the following description are merely examples, and it is added that the present disclosure is not limited to these proper names and numerical values, and that these proper names and numerical values are not necessarily related to actual proper names and numerical values.

<Details of Simulation System 1>

Figure 2:
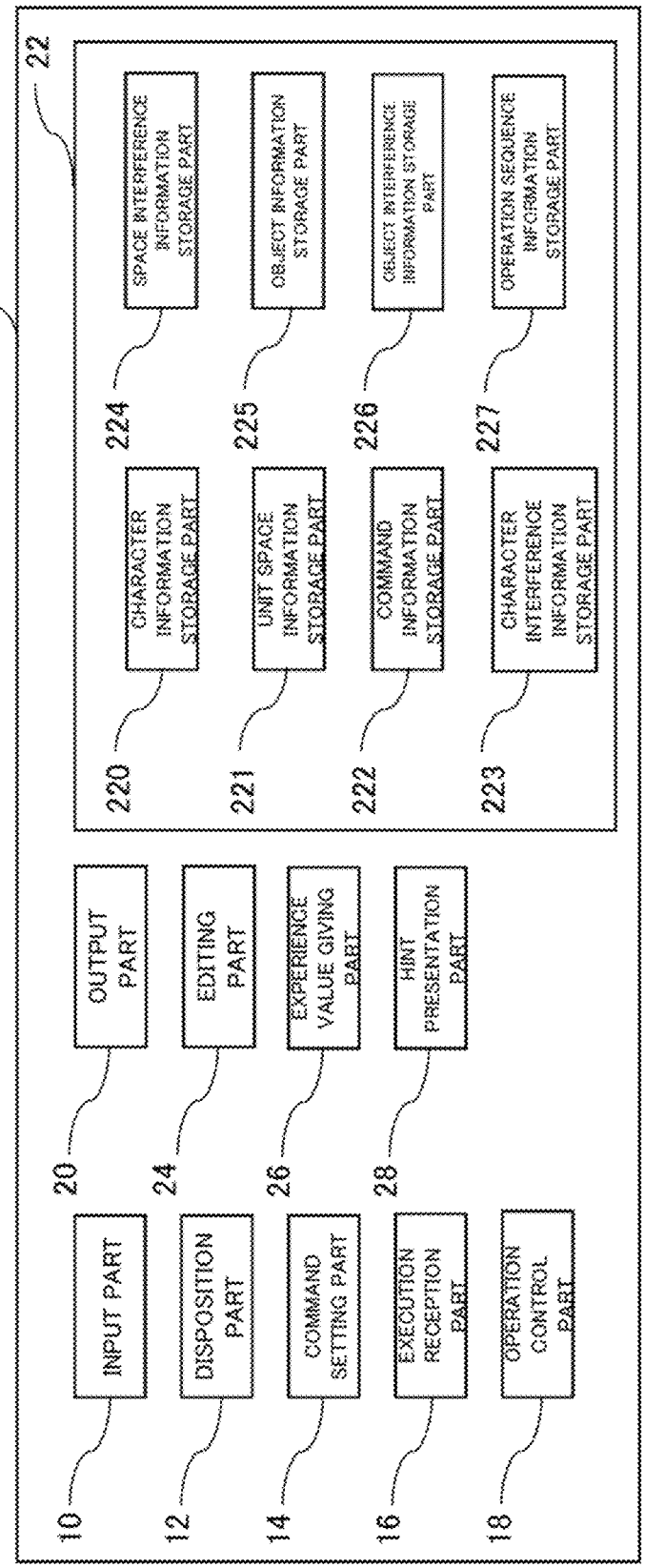
FIG. 2 is a functional configuration block diagram of the simulation system according to one or more aspects of the present disclosure.
Figure 3:
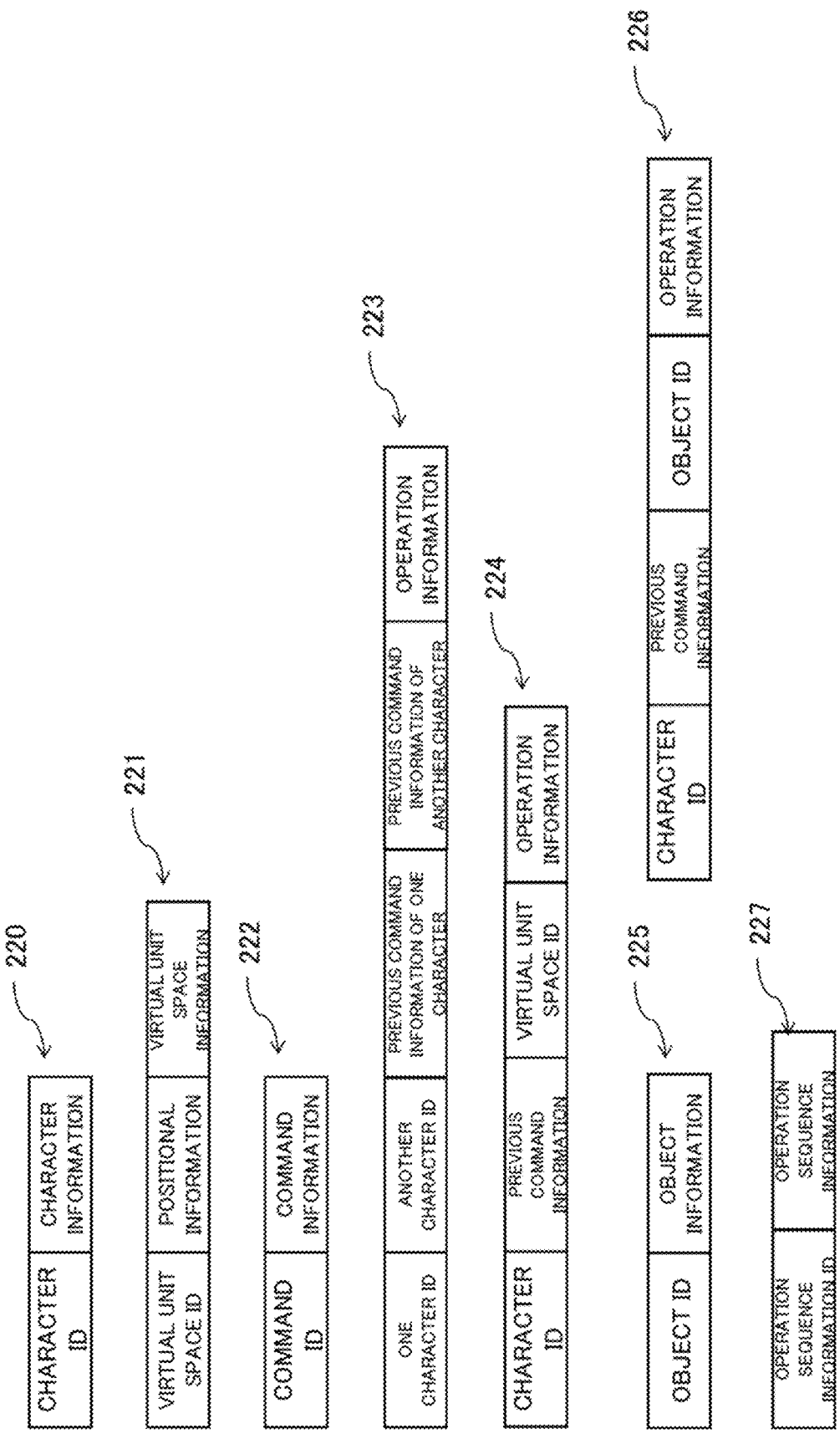
FIG. 3 is a data configuration diagram of storage parts included in a storage unit according to one or more aspects of the present disclosure.

FIG. 2 illustrates an example of a functional configuration of the simulation system according to one or more aspects of the disclosed subject matter. In addition, FIG. 3 illustrates an example of data configurations of storage parts included in the storage unit according to one or more aspects of the disclosed subject matter.

[Outline of Configuration of Simulation System 1]

The simulation system 1 according to an exemplary embodiment includes an input part 10 that receives an input of a predetermined instruction or information, a disposition part 12 that disposes a character or the like in the virtual space 100, a command setting part 14 that sets a command to be executed by a character, an execution reception part 16 that receives the execution of a command, an operation control part 18 that controls an operation of a character, an output part 20 that outputs an operation of a character, or the like, a storage unit 22 that stores various information, an editing part 24 that adds a modification or the like to a virtual unit space, an object, or the like, an experience value giving part 26 that gives an experience value to a character, and a hint presentation part 28 that presents a hint for a command to a user.

The storage unit 22 includes a character information storage part 220 that stores information regarding a character, a unit space information storage part 221 that stores information regarding a virtual unit space, a command information storage part 222 that stores information regarding a command, a character interference information storage part 223 that stores information regarding interference with a character, a space interference information storage part 224 that stores information regarding interference with a virtual space, an object information storage part 225 that stores information regarding an object, an object interference information storage part 226 that stores information regarding interference with an object, and an operation sequence information storage part 227 that stores information regarding a series of operations of a character.

The simulation system 1 may not only include have the plurality of components in physically the same device or location, but may also install some of the plurality of components at physically separated positions. For example, the simulation system 1 may cause an external server to play a role in performing some of the functions of the components. In addition, the simulation system 1 may be configured as one or more servers. In this case, the simulation system 1 is configured by combining an information terminal, components of one server, and components of another server. Further, an aggregate of predetermined components can be perceived as one "information processing device," and the simulation system 1 may be formed as an aggregate of a plurality of information processing devices. A method of distributing a plurality of functions required for realizing the simulation system 1 to one or a plurality of pieces of hardware can be appropriately determined in consideration of the processing capability of each piece of hardware and/or specifications required for the simulation system 1, and the like. Alternatively, or additionally, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. Further, various information stored in the storage unit 22 may be updated in accordance with a user's instruction or information received through the input part 10, or predetermined information may be acquired from a predetermined server existing outside the simulation system 1 and updated at any time.

[Details of Configuration of Simulation System 1]

In the following description, a case where a user executes simulation provided by the simulation system 1 mainly using an information terminal will be described as an example.

(Input Part 10, Output Part 20)

The input part 10 receives an input such as a predetermined instruction from a user. The input part 10 is, for example, a touch panel, a keyboard, a mouse, a microphone, a motion sensor, or the like of the information terminal. The input part 10 supplies the instruction to a predetermined component of the simulation system 1. Components having received the instruction exhibits predetermined functions.

The output part 20 outputs various processing results before execution, during execution, and/or after execution of an operation of a character in the simulation system 1, and the state of the virtual space 100. The output part 20 outputs various processing results, information stored in the storage unit 22, the state of the virtual space 100, and the like so that the user can perceive them. Specifically, the output part 20 outputs various processing results, stored information, and the like as a predetermined format of data, a still image, a moving image, voice, text, and/or physical phenomenon such as vibration. For example, the output part 20 is a display part, a speaker, a vibration part (a device which is provided in the information terminal and generates vibration in response to a predetermined electrical signal), a light-emitting part, a data output part, or the like of the information terminal. In addition, the output part 20 can also output information regarding the disposition of a character, an object, or the like in the virtual space 100 which is set by a user, information indicating a command and the order of the command which are set for a character or an object, and/or information regarding a predetermined operation of a character having executed the operation due to interference to the outside in a predetermined data format in response to the user's instruction. In addition, the output part 20 can also output information received from an external server.

(Storage Unit 22)

The storage unit 22 stores various information related to the simulation system 1. The storage parts included in the storage unit 22 supply predetermined information to a predetermined component in response to a request received from another component of the simulation system 1.

(Storage Unit 22: Character Information Storage Part 220)

The character information storage part 220 stores information regarding a character used for simulation. Specifically, the character information storage part 220 stores character information and the like in association with a character ID for identifying a character. The character information, which is the features of the character, is information indicating, for example, the attribute of the character, the type of the character, the name of the character, the sex of the character, the ability of the character, the technique of the character, the size of the character, the weight (body weight) of the character, an experience value, a level, and the like.

Note that the attribute is information which is set for each character, and is the features of the character which are set in accordance with, for example, the type, state, properties, ability, or the like of the character. The attribute is not particularly limited, and examples thereof include attributes of names such as normal, flame, water, grass, ice, electricity, and ghost. Note that a plurality of attributes may be set for one character. In addition, the attributes may be attributes such as "techniques" remembered by the character or "skills" that are set for items that the character has. In this case, for example, the character may have both the attribute of the character itself and the attribute a "technique" remembered by the character (may be the same as or different from the attributes of the character itself).

(Storage Unit 22: Unit Space Information Storage Part 221)

The unit space information storage part 221 stores virtual unit space information which is information indicating features of a virtual unit space in association with a virtual unit space ID for identifying the virtual unit space, the virtual unit space information being positional information indicating the position of the virtual unit space in a virtual space and information regarding the terrain, the weather, and the like associated with the virtual unit space. Examples of the virtual unit space information include topographical information, weather information, interference possibility information, and the like.

Specific examples of the topographical information include information indicating meadows, coasts, waterfront, mountains, rocky areas, towns, graveyards, or the like, and the virtual unit space is output from the output part 20 as a virtual unit space indicating the terrain corresponding to the topographical information based on the associated topographical information. For example, as the virtual unit space, a virtual unit space including a characteristic object (this object may be an object that can be disposed by a user or disposed in advance by the simulation system 1) or the like in the terrain of each of a plurality of types such as meadows, coasts, and waterfront may be prepared in advance. In addition, the weather information, which is information regarding the weather that can be set for each virtual unit space, is information indicating, for example, fine weather, cloudy weather, rainy weather, thunderstorm, snow, or the like. The virtual unit space associated with the weather information is output from the output part 20 as a virtual unit space indicating the weather corresponding to the weather information, based on the associated weather information.

In addition, the interference possibility information is information indicating whether a user and/or a character can interfere with a virtual unit space. For example, in a case where the interference possibility information is information indicating that interference is possible, the editing part 24 can receive a user's predetermined instruction through the input part 10 for a virtual unit space in which interference is possible, and reflect the instruction in the virtual unit space. For example, in a case where interference for deforming the terrain of a virtual unit space is possible, the editing part 24 can deform the terrain of the virtual unit space in response to the user's instruction (as an example, deformation that destroys mountainous terrain, deformation that raises flat ground with soil, deformation that fills swamps, and the like). Further, in a case where the interference possibility information is information indicating that interference is possible, interference such as destruction by a character may be enabled for a virtual unit space in which interference is possible. On the other hand, in a case where the interference possibility information is information indicating that interference is not possible, interference by a user and a character is prohibited for a virtual unit space in which interference is not possible.

(Storage Unit 22: Command Information Storage Part 222)

The command information storage part 222 stores command information indicating the content of a command to be executed by a character, in association with a command ID for identifying the command. The command information storage part 222 stores a plurality of pieces of command information.

Here, the command includes at least one of a command for moving a character in a virtual space without designating an arrival position in the virtual space (that is, an operation command for changing a virtual unit space in which a character is positioned without designating which virtual unit space in a virtual space a movement destination virtual unit space is; hereinafter referred to as a "first operation command") and a command for executing a predetermined operation in any one virtual unit space (that is, an operation command for causing a character to execute a predetermined operation in a predetermined virtual unit space in which the character is positioned: hereinafter referred to as a "second operation command"). In addition, the command can also include an operation command for repeating the first operation command and/or the second operation command a predetermined number of times.

The first operation command includes commands regarding a direction of movement (that is, an operation of changing the position of a character to a virtual unit space adjacent to a predetermined virtual unit space) from the predetermined virtual unit space, the amount of movement, and a movement method, and examples thereof include commands such as moving forward, returning backward, moving right or left, jumping forward, jumping backward, jumping right or left, flying, rolling, crawling, and the like. In addition, the second operation command includes a command for executing a predetermined operation without moving from a predetermined virtual unit space, and examples thereof include commands such as changing the direction of a character in a predetermined direction, jumping on the spot, staying on the spot (standing by), performing a predetermined technique (punching, kicking, an electric shock, other techniques and actions peculiar to the character, and the like), and stopping a command once. Note that commands "the staying on the spot" may be a command (that is, a "pause" command) for maintaining the content of a command immediately before the character reaches the predetermined virtual unit space or a command when the character reaches the predetermined virtual unit space such as a command for maintaining the character sitting, a command for maintaining the character standing, a command for maintaining the character flying in the virtual unit space, or the like.

In addition, the command can also include a command for generating a derived object caused by the existence, technique, or the like of the character in another virtual unit space adjacent to a virtual unit space which is the existence position of the character. For example, it is assumed that the character has a technique of "blowing off fire" as a predetermined technique. In this case, the command for generating a derived object is a command for generating a derived object representing "blowing off fire" in another virtual unit space adjacent to a predetermined virtual unit space in a case where the character is positioned in the virtual unit space of concern and activates a "blowing off fire" technique.

Further, the command may be a command for changing the character to a predetermined character (hereinafter referred to as "evolution") in a case where the character satisfies predetermined conditions. Note that the "evolution" indicates that one character changes to another character which is an evolution destination in a case where predetermined conditions are satisfied.

(Storage Unit 22: Character Interference Information Storage Part 223)

The character interference information storage part 223 stores operation information indicating an operation of one character and/or another character in a case where the one character has interfered with the other character. That is, the character interference information storage part 223 stores operation information of an operation executed by one character and/or another character in a case where the one character and the other character exist in the same virtual unit space.

Specifically, the character interference information storage part 223 may store operation information in association with one character ID for identifying one character and another character ID for identifying another character. In addition, the character interference information storage part 223 may store operation information in association with the one character ID, the other character ID, and command information indicating a command before (preferably, immediately before) the one character exists in the same virtual unit space as the other character (hereinafter referred to as "previous command information of one character") and/or the command information indicating a command before (preferably, immediately before) the other character exists in the same virtual unit space as the one character (hereinafter referred to as "previous command information of another character").

The operation information is set in accordance with, for example, a combination of one character and another character, a combination of character information of the one character and character information of the other character, or the like. In addition, the operation information can also be set in accordance with a command executed until one character reaches the same virtual unit space as another character, or a command executed immediately before one character reaches the same virtual unit space.

Note that the character interference information storage part 223 can also store default operation information in association with information that characterizes a character (for example, the attributes, size, weight, and the like of the character). That is, the character interference information storage part 223 can also store operation information without being associated with one character ID and another character ID. For example, in a case where there are a plurality of characters and a plurality of commands, operation information may not be able to be set for all of combinations of the characters and/or combinations of the commands. In this case, the character interference information storage part 223 stores default operation information in association with, for example, the same points and differences that can be ascertained by comparing features of one character with features of another character. Examples of the default operation information include information or the like for setting an operation in which a character having a smaller size is bounced off by another character in a case where one character and another character have different sizes, and both the characters collide with each other in the same virtual unit space.

<Example of Operation Information Based on Type of Character: Case where Types are the Same>

For example, operation information determined based on the type of one character and the type of another character will be described. First, in a case where the type of one character and the type of another character are the same, and the one character and the other character exist in the same virtual unit space, operation information can be set based on a previous command of the one character and a previous command of the other character.

For example, in a case where the previous command of one character is "move forward", and the previous command of another character is also "move forward", it is possible to set information as operation information, the information indicating an operation in which the one character and the other character "collide" with each other in the same virtual unit space, and both the one character and the other character are retreated to a virtual unit space in which the characters has existed immediately before. Further, in a case where the previous command of the one character is "jump forward", and the previous command of the other character is "stopping" (here, it is assumed that the one character "jumps forward" to reach a virtual unit space in which the other character is "stopping"), it is possible to set information as the operation information, the information indicating an operation in which the one character and the other character overlap each other in the same virtual unit space, that is, an operation in which the one character gets on the other character.

Further, in a case where the previous command of one character is "move forward", another character is turning its back on the one character in a predetermined virtual unit space, and the previous command of the other character is "stopping" (note that it is assumed that the one character "moves forward" to reach a predetermined virtual unit space in which the other character is "stopping"), it is possible to set information as operation information, the information indicating an operation in which the other character is pushed out to another virtual unit space adjacent to a predetermined virtual unit space in a moving direction of the one character.

<Example of Operation Information Based on Type of Character: Case where Types are the Same, and Size is Equal to or Greater than Predetermined Size>

Note that, even when the types of characters are the same, special operation information can also be set in accordance with the features of the characters, unlike the above description. For example, in a case where the type of one character and the type of another character are the same, the sizes and/or weights of both the characters are equal to or greater than a predetermined value, and the one character and the other character exist in the same virtual unit space, predetermined operation information can be set based on a previous command of the one character and a previous command of the other character.

For example, in a case where the previous command of one character is "jump forward", and the previous command of another character is "stopping" (here, it is assumed that the one character "jumps forward" to reach a virtual unit space in which the other character is "stopping"), it is possible to set information as operation information, the information indicating an operation in which the one character "collides" with the other character in the same virtual unit space, and the one character stands in a virtual unit space in which the character has existed immediately before, rather than a case where the one character gets on the other character unlike the above description because the sizes of both the characters are equal to or greater than a predetermined value (the one character cannot jump high).

<Example of Operation Information Based on Type of Character: Case where Types are Different from Each Other (Part 1)>

In a case where the type of one character and the type of another character are different from each other, and the one character and the other character exist in the same virtual unit space, operation information can be set based on features of the one character, features of the other character, a previous command of the one character, and a previous command of the other character.

For example, in a case where the weight of one character is set as the features of the one character, the weight of another character is set as the features of the other character, and the weight of the one character is smaller than the weight of the other character, and in a case where the previous command of the one character is "move forward", and the previous command of the other character is also "move forward", it is possible to set information as operation information, the information indicating an operation in which the one character and the other character collide with each other in the same virtual unit space (a virtual unit space which is a collision position), and the one character is retreated to a virtual unit space in which the character has existed immediately before, and an operation in which the other character stays in the virtual unit space which is a collision position.

<Example of Operation Information Based on Type of Character: Case where Types are Different from Each Other (Part 2)>

In a case where the type of one character and the type of another character are different from each other, and the one character and the other character exist in the same virtual unit space, operation information can be set based on special features of the one character.

For example, description will be given of a case where one character has a feature that the character has ability to be able to copy features of another character existing in a virtual unit space positioned in front of the one character, the virtual unit space being adjacent to a virtual unit space in which the character exists. In this case, when the previous command of one character is "move forward", and the previous command of another character is "stopping" or has a content that a predetermined operation is executed on the spot, it is possible to set information as operation information, the information indicating an operation in which the one character moves forward after copying the ability of the other character and collides with the other character because the other character is positioned in front of the one character. In this case, as the operation information, information indicating the other character's surprise operation may be set at the same time.

<Example of Operation Information Based on Size of Character>

For example, a case where the size of one character and the size of another character are different from each other will be described. Here, it is assumed that the size of the one character is smaller than the size of the other character. In this case, as operation information, an operation when the one character has reached a virtual unit space in which the other character exists is set. This operation may be, for example, an operation in which the one character collides with the other character and bounces back in the opposite direction in a path where the one character has reached the virtual unit space of concern.

<Example of Operation Information Based on Previous Command of Character (Part 1)>

In addition, description will be given of a case where the type of one character and the type of another character are different from each other, the size of the one character and the size of the other character are different from each other, and the one character can be evolved. Here, it is assumed that the size of the one character is smaller than the size of the other character. Further, in a case where one character and another character exist in the same virtual unit space, operation information can be set based on a previous command of the one character and a previous command of the other character.

For example, in a case where a previous command when one character that has not been evolved reaches a predetermined virtual unit space is "move forward", and a previous command of another character is "sleeping" in the predetermined virtual unit space, it is possible to set an operation in which the one character collides with the other character and bounces back in the opposite direction in a path where the one character has reached the virtual unit space of concern, and set an operation in which the other character continues to "sleep" as it is, as operation information.

On the other hand, for example, in a case where one character satisfies predetermined conditions before reaching a predetermined virtual unit space to be "evolved", a previous command of the one character after the evolution is "move forward", and a previous command of another character is "sleeping", it is possible to set an information as operation information, the information indicating an operation in which the one character collides with the other character in the same virtual unit space (a virtual unit space which is a collision position), the other character is "awake", and the one character and the other character are stopped in the state of remaining awake together in the virtual unit space which is a collision position.

<Example of Operation Information Based on Previous Command of Character (Part 2)>

In addition, description will be given of a case where the type of one character and the type of another character are different from each other, the size of the one character and the size of the other character are different from each other, and the size of the one character is smaller than the size of the other character. Further, it is assumed that the one character exists in a virtual unit space above a virtual unit space in which the other character exists.

Here, in a case where a previous command when the one character reaches a predetermined virtual unit space in which the other character exists is "falling" or the like (or when there is no object or the like that interrupts the falling of a character above the predetermined virtual unit space, the one character may fall toward the predetermined virtual unit space with any command), and a previous command of the other character is "staying" in the predetermined virtual unit space, it is possible to set information as operation information, the information indicating an operation in which the one character collides with the other character and lands in a virtual unit space adjacent to the virtual unit space of concern while bouncing. On the other hand, in a case where the one character has reached a predetermined virtual unit space along the same plane as the predetermined virtual unit space in which the other character exists, it is possible to set information as operation information, the information indicating an operation in which the one character collides with the other character and bounces back in a direction opposite to a moving direction.

In addition, description will be given of a case where the type of the one character and the type of the other character are different from each other, and the one character can use a predetermined technique (for example, an electric shock).

Here, in a case where a previous command in a case where the one character reaches a predetermined virtual unit space in which the other character exists is "move forward", a command for activating an "electric shock" after "move forward" is set, and a previous command of the other character is "sleeping" in the predetermined virtual unit space, it is possible to set information as operation information, the information indicating an operation in which the one character activates an "electric shock" when colliding with the other character, and the other character is surprised by an "electric shock" and jump up.

(Storage Unit 22: Space Interference Information Storage Part 224)

The space interference information storage part 224 stores operation information indicating an operation of one character in a case where the one character has interfered with a virtual unit space. That is, the space interference information storage part 224 stores operation information of an operation executed by the one character in a case where the one character exists in a predetermined virtual unit space. Note that the operation information also includes information for changing the state of a virtual unit space in which the one character exists by the interference of the one character.

Specifically, the space interference information storage part 224 stores operation information in association with a character ID and a virtual unit space ID for identifying a predetermined virtual unit space. In addition, the space interference information storage part 224 may store operation information in association with a character ID, a virtual unit space ID, and command information (hereinafter referred to as "previous command information of character") indicating a command before (preferably, immediately before) the character exists in a virtual unit space identified by the virtual unit space of concern ID.

The operation information is set by, for example, a combination of features of a character, or the like and virtual unit space information, or the like. In addition, the operation information can also be set by a command executed until the character reaches a predetermined virtual unit space, or a command executed immediately before the character reaches the predetermined virtual unit space.

<Example of Operation Information Based on Terrain of Virtual Unit Space>

For example, a case where a character has reached a virtual unit space of a predetermined terrain will be described. As an example, description will be given of a case where a virtual unit space has a terrain of a "river", and a character has reached the virtual unit space of concern in which the character has a "river" in accordance with a command set by the command setting part 14.

Here, in a case where a previous command of the character is "move forward", and the attribute of the character is a "water type", it is possible to set information as operation information, the information indicating an operation in which the character moves in a virtual unit space having a "river" similarly to a virtual unit space that does not have a "river". Further, in a case where a previous command of the character is "move forward", the attribute of the character is a "water type", and the character is a character that can swim in the water, it is possible to set information as operation information, the information indicating an operation in which the character swims in a "river" in a virtual unit space having a "river". On the other hand, in a case where a previous command of a character is "move forward", and the attribute of the character is a "flame type", it is possible to set information as operation information, the information indicating an operation in which the character cannot move to a virtual unit space having a "river" and is retreated. Further, in a case where a previous command of a character is "move forward", and the attribute of the character is a "rock type", information indicating an operation in which the character is swept by a "river" and moves to another virtual unit space adjacent to the virtual unit space having a "river" may be set as operation information. Further, in a case where a previous command of a character is "move forward", the attribute of the character is a "rock type", and the size of the character is equal to or greater than a predetermined size, information indicating an operation in which the character fits in the "river" and information that outputs how water overflows from the "river" may be set as operation information.

<Example of Operation Information Based on Weather of Virtual Unit Space>

For example, a case where the character has reached and/or exists in a virtual unit space of a predetermined weather will be described. As an example, description will be given of an example in which the weather in a virtual unit space is "rainy weather", and a character reaches the virtual unit space of concern in accordance with a command that is set by the command setting part 14.

Here, in a case where a previous command of the character and/or a command in the virtual unit space of "rainy weather" is "running and moving by one square", it is possible to set information as operation information, the information indicating an operation in which the character slips and moves one or more extra squares with a predetermined probability (for example, randomly) in a case where the character moves through the virtual unit space of "rainy weather". Further, in a case where a previous command of the character and/or a command in the virtual unit space of "rainy weather" is a "weather changing technique", it is also possible to set information as operation information, the information indicating that the weather of the virtual unit space in which the character exists is changed using the technique.

<Example of Operation Information Based on Virtual Unit Space and Attribute of Character>

For example, a case where a character has reached a virtual unit space of a predetermined terrain will be described. As an example, description will be given of an example in which a virtual unit space has a terrain of a "wall", and a character has reached the virtual unit space of concern having a "wall" in accordance with a command set by the command setting part 14.

Here, in a case where a previous command of the character is "move forward", and the attribute of the character is a "normal type", it is possible to set information as operation information, the information indicating an operation in which the character cannot move through a virtual unit space having a "wall" and stays in a virtual unit space immediately before reaching the virtual unit space of concern. Further, in a case where a previous command of the character is "move forward", and the attribute of the character is a "ghost type", it is possible to set information as operation information, the information indicating an operation in which the character passes through the virtual unit space having a "wall" and moves.

(Storage Unit 22: Object Information Storage Part 225)

The object information storage part 225 stores information regarding an object that can be disposed in a virtual unit space (object information). Specifically, the object information storage part 225 stores the object information and the like in association with an object ID for identifying the object. The object information is information indicating, for example, the attribute of the object, the type of the object, the name of the object, the size of the object, whether the object can be destroyed, and the like. Note that the attribute is information which is set for each object, and is the features of the object which are set in accordance with, for example, the type, state, properties, or the like of the object. Note that a plurality of attributes may be set for one object.

In addition, the object is an object that can be disposed in a virtual unit space, and can include an object for which an environment such as the terrain of the virtual unit space can be set or deformed (hereinafter referred to as an "environment object"). The environment object may include objects representing a terrain (for example, trees, rocks, rivers, and the like), objects representing structures (for example, walls, buildings, floors, and the like), and/or a character for which a command cannot be set by the command setting part 14 (for example, a character that is sleeping in a predetermined virtual unit space or is not moving even when the character is awake, or the like), and the like. In addition, the environment object may include an object that can be interfered with by a character and an object that cannot be interfered with by a character. The object that can be interfered with by a character is an object (for example, a tree, a rock, or the like that can be destroyed) that can be destroyed by an operation (for example, a predetermined technique, a rush, or the like) of the character. On the other hand, the object that cannot be interfered with by a character is an object (for example, a floor, a wall, or the like that cannot be destroyed) that cannot be destroyed by an operation of the character. Further, the object may include a derived object specific to a predetermined character. The derived object is, for example, an object that is generated in accordance with the activation of an operation of a predetermined character (as an example, a technique of the predetermined character).

(Storage Unit 22: Object Interference Information Storage Part 226)

The object interference information storage part 226 stores operation information indicating an operation of a character and/or an object in a case where the character has interfered with the object. That is, the object interference information storage part 226 stores operation information regarding an operation executed by the character and/or influence received by the object in a case where the character and the object exist in the same virtual unit space.

Specifically, the object interference information storage part 226 stores operation information in association with a character ID and an object ID. In addition, the object interference information storage part 226 may store operation information in association with the character ID, the object ID, and command information (hereinafter referred to as "previous command information of character") indicating a command before (preferably, immediately before) the character exists in the same virtual unit space as the object.

The operation information is set by, for example, a combination of the character and the object, a combination of character information of the character and object information of the object, or the like. In addition, the operation information can also be set in accordance with a command executed until the character reaches the same virtual unit space as the object, or a command executed immediately before the character reaches the same virtual unit space.

<Example of Operation Information Based on Type of Object>

For example, a case where a character has reached a virtual unit space in which a predetermined object is disposed will be described.

As an example, it is assumed that an environment object representing a "rock" is disposed in a virtual unit space, and the environment object is an object that can be interfered with. Further, in a case where a character has reached the virtual unit space, a previous command of the character is "activation of technique", and an environment object which is a "rock" can be destroyed in the technique, it is possible to set information as operation information, the information indicating an operation in which the character destroys the "rock" using a "technique". In addition, it is assumed that an environment object representing a "rock" is disposed in a virtual unit space, and the "rock" is an object that cannot be interfered with by the environment object. Further, even when a previous command of the character is any command in a case where the character has reached the virtual unit space, it is possible to set information as operation information, the information indicating an operation in which the character bounces back by the "rock" and is retreated to a virtual unit space immediately before the character reaches the virtual unit space of concern.

In addition, as an object, an object that can be evolved by a predetermined character acquiring the object can be prepared. For example, the disposition part 12 disposes an object (an object for evolution) required for evolution of a predetermined character in a predetermined virtual unit space. Further, even when a previous command of the character is any command in a case where the predetermined character has reached the virtual unit space in which the object for evolution is disposed, in accordance with a command set by the command setting part 14, information indicating an operation in which the character is evolved can be set as operation information.

(Storage Unit 22: Operation Sequence Information Storage Part 227)

The operation sequence information storage part 227 stores operation sequence information in association with an operation sequence information ID for identifying the operation sequence information. The operation sequence information is information including a virtual space 100 used for an operation of a character, disposition results obtained by the disposition part 12, one or more commands and the order of execution of the commands which are set for a predetermined character by the command setting part 14, and an operation of the character which is controlled by the operation control part 18 to be described later. That is, the operation sequence information is information making it possible to reproduce the disposition of a character and/or an object in the virtual space 100, and a series of operations from when an operation of the character is started to when the operation is terminated in the virtual space 100 at any timing in any system including the simulation system 1.

The output part 20 can execute an operation of the character in the virtual space 100 at any timing based on the operation sequence information, and typically can reproduce the operation of the character in the virtual space 100 as a moving image on a display part or the like of an information terminal in response to a user's instruction. The operation sequence information may be provided to, for example, an information terminal, a server, or the like outside the simulation system 1 in which the operation sequence information is generated, through a communication network, a storage medium, or the like. The information terminal, the server, or the like to which the operation sequence information is provided can execute the operation of the character in the virtual space 100 using the operation sequence information. Thereby, one user can provide the operation sequence information created in the simulation system 1 to a simulation system 1 of another user.

(Disposition Part 12)

The disposition part 12 disposes a character and/or an object in the virtual unit space 110 constituting the virtual space 100. The disposition part 12 can also dispose a character and/or an object in the virtual unit space 110 in advance. In addition, the disposition part 12 can dispose a predetermined character and/or a predetermined object in the virtual unit space 110 designated by a user in response to the user's instruction received by the input part 10. The disposition part 12 can also dispose a character and/or an object in each of the plurality of virtual unit spaces 110. That is, the disposition part 12 can dispose one or more characters in each of one or more virtual unit spaces 110 and/or can dispose one or more objects in each of one or more virtual unit spaces 110. Note that, since the virtual space 100 is configured to have a virtual three-dimensional structure, the disposition part 12 can also dispose a character and/or an object not only on the lower surface 102 of the virtual space 100 but also in the virtual unit space 110 above the lower surface 102.

Specifically, the output part 20 outputs information of a character which is stored in the character information storage part 220 and/or an object which is stored in the object information storage part 225 (for example, list information of a character and/or an object which can be used in the simulation system 1 by the user) to a display part of an information terminal. In addition, the disposition part 12 receives the user's instruction for selecting a character and/or an object through the input part 10 to acquire information of a character, which is selected by the user, which is stored in the character information storage part 220 and/or information of an object, which is selected by the user, which is stored in the object information storage part 225. In addition, the output part 20 outputs the virtual space 100 constitute by the virtual unit space 110 to a display part of an information terminal. The disposition part 12 receives the user's selection instruction of the virtual unit space 110 through the input part 10 for each character and/or object selected by the user. In addition, the disposition part 12 disposes the character indicated by the acquired information of the character and/or the object indicated by the acquired information of the object in the virtual unit space based on the user's selection instruction. The output part 20 can output an image indicating a state where the disposition part 12 disposes the character and/or the object in the virtual space. The disposition part 12 supplies information on the character and/or the object disposed in the virtual space 100 to the operation control part 18.

(Command Setting Part 14)

The command setting part 14 sets one or more commands executed by a character in the virtual space 100, and in a case where a plurality of commands are set, the command setting part 14 sets the order of execution of the plurality of commands for a character. In a case where a plurality of characters are selected by a user, the command setting part 14 sets commands and the order of execution of the commands for each of one character and another character. That is, the command setting part 14 receives a command selected by the user and the order of execution of the selected command through the input part 10 and associates the received commands and the order of execution of the commands with the character selected by the user. Specifically, the output part 20 outputs information regarding a command for a character which is stored in the command information storage part 222 so that the user can perceive the information. In addition, the command setting part 14 receives an instruction for setting commands and the order of execution of the commands by the user referring to the information on the command through the input part 10, and associates the received commands and the order of execution of the commands with the character selected by the user. In addition, the output part 20 can output the commands and the order of execution of the commands which are set by the command setting part 14 so that the user can perceive them using text, a predetermined figure, or the like. The command setting part 14 supplies information indicating the commands and the order of execution of the commands which are associated with the character to the operation control part 18.

Note that the command setting part 14 can also automatically set commands and the order of execution of the commands without receiving commands selected by the user and the user's instruction for the order of execution of the commands. In this case, for example, the command setting part 14 can also randomly set commands and the order of execution of the commands and can also set predetermined commands and the order of execution of the commands. As an example, the command setting part 14 may set a predetermined commands and the order of execution of the commands in a predetermined character as a tutorial.

Specifically, the command set by the command setting part 14 is a command which is stored in the command information storage part 222. Examples of the command set by the command setting part 14 includes the above-described first operation command and second operation command, a repetition operation command, a command for generating a derived object, a command for performing evolution, and the like. Note that the command setting part 14 can set the amount of movement from a predetermined virtual unit space included in the first operation command with the number of virtual unit spaces as a unit. That is, it is possible to set a command such as "moving forward by two squares" for a character by treating the virtual unit space as a virtual square. It becomes easy to set the movement of a character by treating a virtual unit space as a virtual square. In addition, the order of execution of the command set by the command setting part 14 can be freely set in accordance with a user's desire.

<Example of Command Including Case where Character is Evolved During Operation in Virtual Space 100>

Here, a case where the command setting part 14 sets a command for "evolution" for one character is described as an example. For example, it is assumed that the command setting part 14 has set commands of "move forward", "activation of technique", "move forward", "evolution", "move forward", and "activation of technique" in this order for one character. In this case, the command setting part 14 may make a command of "activation of technique" before evolution and a command of "activation of technique" after evolution different depending on before and after the evolution of a character. That is, the user may not only simply set a command of "activation of technique" but also appropriately set the content of a "technique" based on the contents of commands and the order of execution of the commands which are set by the command setting part 14. In this example, it is assumed that the technique of the character before evolution and the technique of the character after evolution are different. For this reason, in a case where the user sets a command of "activation of technique" for the character after evolution, the command setting part 14 determines that the "technique" is the "technique" of the character after evolution, and may perform setting so that the "technique" of the character after evolution is activated instead of the "technique" of the character before evolution.

(Execution Reception Part 16)

The execution reception part 16 receives an instruction for executing a command set by the command setting part 14. Specifically, the execution reception part 16 receives the instruction for executing a command from a user through the input part 10. In a case where the user sets a command for a plurality of characters, the execution reception part 16 can receive the execution of the command in accordance with, for example, any one of the following patterns.

(Pattern 1) Instructions for executing commands for all of a plurality of characters are collectively received.

(Pattern 2) A plurality of characters are divided into a plurality of groups, and an instruction of executing a command is received at a different timing for each of the groups or at the same timing for some of the groups.

(Pattern 3) An instruction for executing a command is received for each character selected from among a plurality of characters by a user.

The execution reception part 16 supplies information indicating that an instruction for executing a command for a predetermined character has been received to the operation control part 18.

(Operation Control Part 18)

The operation control part 18 operates a character disposed in the virtual space 100 by the disposition part 12 in the virtual space 100, based on commands and the order of execution of the commands which are set by the command setting part 14 in accordance with information received from the execution reception part 16. Further, in a case where commands and the order of execution of the commands are set for each of one character and another character, the operation control part 18 starts to execute a command based on the order of execution of each command for each of the one character and the other character in accordance with a user's one operation (for example, an instruction for executing a command which is received through the input part 10). Further, in a case where interference has occurred in the virtual space 100 between another character, an object disposed in a predetermined virtual unit space, and/or the predetermined virtual unit space, and a character for which the execution of a command has been started, the operation control part 18 causes the character to execute an operation according to the interference with preference over the commands and the order of execution of the commands which are set by the command setting part 14. That is, in this case, the operation control part 18 can determine an operation to be executed by the character in accordance with a predetermined rule. In addition, the operation control part 18 outputs the state of the character that is executing a command to the output part 20.

Note that, in a case where a command set by the command setting part 14 cannot be executed due to a relationship between a character and a virtual space in which the character exists, the operation control part 18 can also cause the character to execute a predetermined operation. For example, in a case where the character is disposed in the air of the virtual space 100 by the disposition part 12, the character is a character that cannot fly or float in the air, and the command set by the command setting part 14 is a movement command such as "move forward", the operation control part 18 determines that the movement command cannot be executed. In addition, the operation control part 18 stops the execution of the movement command and operates the character in accordance with, for example, physical laws (in this case, a character is dropped downward from the existence position of the character). Subsequently, the operation control part 18 continues executing the command set by the command setting part 14 at a stage where the command set by the command setting part 14 can be executed (in this case, at a stage where the character has landed on the floor in the virtual space).

Here, in a case where a character is moved in the virtual space 100 based on the commands and the order of execution of the commands which are set by the command setting part 14, the operation control part 18 moves the character from one virtual unit space to another virtual unit space adjacent to the one virtual unit space. When a virtual unit space is treated as a "square", the operation control part 18 moves a character for each "square". Note that the operation control part 18 may move a character for each predetermined period of time. That is, the operation control part 18 may seamlessly move the character over a plurality of virtual unit spaces for each predetermined period of time (as an example, it is possible to perform setting for moving one virtual unit space per second).

Note that, in a case where interference has occurred between a character, which operates based on the commands and the order of execution of the commands which are set by the command setting part 14, and another character or an object and in a case where interference has occurred between a character, which operates based on the commands and the order of execution of the commands, and a predetermined virtual unit space, the operation control part 18 may control an operation of the character also using an operation determined based on physical arithmetic calculation. For example, in a case where a character and another character or an object collide with each other, operations of the character and another character or the object may be calculated by physical arithmetic calculation based on the shape, size, weight, and the like of the character, the shape, size, weight, and the like of the other character, the speed of collision, and the like, and the character may be caused to execute the calculated operation.

Further, the operation control part 18 generates operation sequence information indicating a series of operations (including an operation based on a command set by the command setting part 14 and an operation in a case where interference has occurred) of a character in the virtual space 100, and stores the generated operation sequence information in the operation sequence information storage part 227 in association with an operation sequence information ID of the operation sequence information. Note that the operation control part 18 can also generate operation sequence information indicating some of the series of operations of the character in the virtual space 100 as the operation sequence information. That is, the operation control part 18 can generate operation sequence information including all or some of operations of the character based on the execution of a command according to the order of execution of the command which is set by the command setting part 14, and operations of the character in a case where interference has occurred.

Specifically, the operation control part 18 can control an operation of a character based on features of the character and features of a virtual unit space corresponding to the existence position of the character. As an example, the operation control part 18 acquires operation information stored in the space interference information storage part 224 in association with a character ID of a character that is executing a command and a virtual unit space ID of a virtual unit space in which the character exists. In addition, the operation control part 18 causes the character to execute an operation indicated by the content of the operation information with reference to the acquired operation information. In addition, the operation control part 18 may acquire operation information stored in the space interference information storage part 224 in association with a character ID of a character that is executing a command, a virtual unit space ID of a virtual unit space in which the character exists, and a command executed immediately before the character reaches the virtual unit space of concern (previous command information), and may cause the character to execute a predetermined operation based on the operation information.

Further, in a case where each of one character and another character is operated in the virtual space 100, and the existence position of the one character and the existence position of the other character are the same virtual unit space, the operation control part 18 can cause at least one of the one character and the other character to execute a predetermined operation with preference over commands and the order of execution of the commands which are set by the command setting part 14. In this case, the operation control part 18 can control at least any one of the one character and the other character based on at least one selected from a group consisting of a combination of features of the one character and features of the other character, a command executed before the one character and the other character are positioned in the same virtual unit space, and a command executed before the other character is positioned in the same virtual unit space as the one character.

For example, in a case where one character and another character exist in the same virtual unit space, the operation control part 18 causes the one character and/or the other character to execute an operation indicated by the content of operation information with reference to the operation information stored in the character interference information storage part 223 in association with a character ID of one character that is executing a command and another character ID of the other character. In addition, the operation control part 18 may acquire operation information stored in the character interference information storage part 223 in association with one character ID of the one character that is executing a command and the other character ID of the other character, and a command executed immediately before the one character reaches a virtual unit space in which the character exists (previous command information of one character) and/or a command executed immediately before the other character reaches the virtual unit space of concern (previous command information of another character), and may cause the one character and/or the other character to execute a predetermined operation based on the operation information.

In addition, the operation control part 18 can control an operation of a character based on features of a character and features of an object disposed at the existence position of the character. As an example, the operation control part 18 acquires operation information stored in the object interference information storage part 226 in association with a character ID of a character that is executing a command and an object ID of an object disposed in a virtual unit space in which the character exists. In addition, the operation control part 18 causes a character to execute an operation indicated by the content of the operation information with reference to the acquired operation information. In addition, the operation control part 18 may acquire operation information stored in the object interference information storage part 226 in association with a character ID of a character that is executing a command, an object ID of an object disposed in a virtual unit space in which the character exists, and a command executed immediately before the character reaches the virtual unit space of concern (previous command information), and may cause the character to execute a predetermined operation based on the operation information.

Note that, in a case where one character exists in one virtual unit space, and another character exists in another virtual unit space adjacent to the one virtual unit space and associated with the generation of a derived object, the operation control part 18 can also control an operation of the other character based on features of the other character and features of the derived object. For example, in a case where the other character exists in another virtual unit space adjacent to one virtual unit space in which the one character exists, and a command for the one character to execute a predetermined operation (for example, an operation that exerts a predetermined effect on another virtual unit space) in one virtual unit space is set by the command setting part 14, the operation control part 18 cause the other character to execute the predetermined operation. That is, the operation control part 18 may acquire operation information stored in the object interference information storage part 226 in association with another character ID and an object ID of the derived object, and may cause the other character to execute the predetermined operation based on the acquired operation information.

Example 1 of Operation Based on Relationship Between Derived Object and Character For example, a case where the command setting part 14 sets a command for generating a derived object specific to one character in another virtual unit space adjacent to one virtual unit space for the one character when the character has reached the one virtual unit space will be described as an example. Here, in a case where the one character has reached one virtual unit space and the other character has reached another virtual unit space, the operation control part 18 executes a predetermined operation with preference over a command set in the other character in accordance with the type of the other character and the type of derived object. That is, the operation control part 18 acquires operation information stored in the object interference information storage part 226 in association with another character ID of the other character and an object ID of the derived object disposed in a virtual unit space in which the other character exists. As an example, the operation information is information including a content that a derived object specific to one character is a derived object that represents an "electric shock" corresponding to an "electric shock" which is a technique of the one character, and another character executes an operation of being paralyzed by the derived object having been subjected to the "electric shock". Thus, the operation control part 18 causes the other character to execute a paralysis operation.

Example 2 of Operation Based on Relationship Between Derived Object and Object

For example, a case where the command setting part 14 sets a command for generating a derived object specific to one character in another virtual unit space adjacent to one virtual unit space for the one character in a case where the one character has reached the one virtual unit space will be described as an example. Here, in a case where the one character has reached the one virtual unit space, and a predetermined object exists in the other virtual unit space, the operation control part 18 has a predetermined influence on a predetermined object in accordance with the type of predetermined object and the type of derived object.

In this case, the object interference information storage part 226 can store operation information including the influence on the predetermined object in association with one character ID of the one character and an object ID of the derived object. In addition, the operation control part 18 acquires the operation information stored in the object interference information storage part 226. As an example, the operation information is information including a content that a derived object specific to one character is a derived object that represents "flame" corresponding to "blowing off fire" which is a technique of the one character, and the predetermined object burns with the derived object of "flame". Thus, the operation control part 18 generates a state where the predetermined object burns.

Further, in a case where it is determined that a command set by the command setting part 14 cannot be executed at the existence position of a character or in a virtual unit space which is a movement destination, the operation control part 18 may execute a predetermined operation. For example, the character cannot be moved to the outside of the virtual space 100. That is, the outer edge of the virtual space 100 functions as an "invisible wall" or an "invisible floor or ceiling" for the character in the virtual space 100. Consequently, in a case where the character moves in the virtual space 100 in accordance with a command set by the command setting part 14, and a situation has occurred in which interference by the character is impossible such as a virtual unit space in which the outer edge of the virtual space 100 or an object that cannot be destroyed is disposed, the operation control part 18 causes the character to execute a predetermined operation. Examples of the predetermined operation include an operation of staying on the spot, an operation of moving along a moving path in the opposite direction, an operation of changing a moving direction, and the like.

(Experience Value Giving Part 26)

The experience value giving part 26 gives an experience value to a character. The experience value is a value acquired by the character, and a level is a numerical value determined in accordance with the sum of given experience values and is a numerical value representing the rank of the character. Note that, in a case where the experience value acquired by the character satisfies predetermined conditions (for example, in a case where the experience value exceeds a predetermined threshold value), it is possible to increase the level of the character in a stepwise manner. The experience value giving part 26 can calculate an experience value based on, for example, the number of times the character has executed a command under the control of the operation control part 18 and/or the number of times the character has interfered with another character or the like, and can give the experience value to the character. Note that, in a case where the character has reached a predetermined level and/or has acquired an experience value equal to or greater than a predetermined value, the operation control part 18 may evolve the character. In addition, the operation control part 18 may change the content of a technique that can be used by the character and/or change the effect of the technique in accordance with the level of the character. For example, it is assumed that a derived object generated in a case where the character has activated a predetermined technique is associated with one virtual unit space. In this case, the operation control part 18 may change a virtual unit space in which the derived object is generated from the one virtual unit space to another virtual unit space, and may generate the derived object in a plurality of virtual unit spaces including the one virtual unit space (that is, the derived object may be generated in each of the plurality of virtual unit spaces).

(Hint Presentation Part 28)

The hint presentation part 28 presents a command that has not been selected so far by a user and/or the order of execution of the command to the user. The hint presentation part 28 outputs the command that has not been selected so far by the user and/or the order of execution of the command to the output part 20 so that the user can perceive them. Specifically, the hint presentation part 28 sets a predetermined flag for a command set by the command setting part 14 among commands stored in the command information storage part 222. In addition, the hint presentation part 28 presents a command for which a flag has not yet been set to the user. A timing at which the hint presentation part 28 presents the flat to the user may be any timing (including a timing corresponding to the user's instruction).

[Flow of Processing of Simulation System 1]

Figure 4:
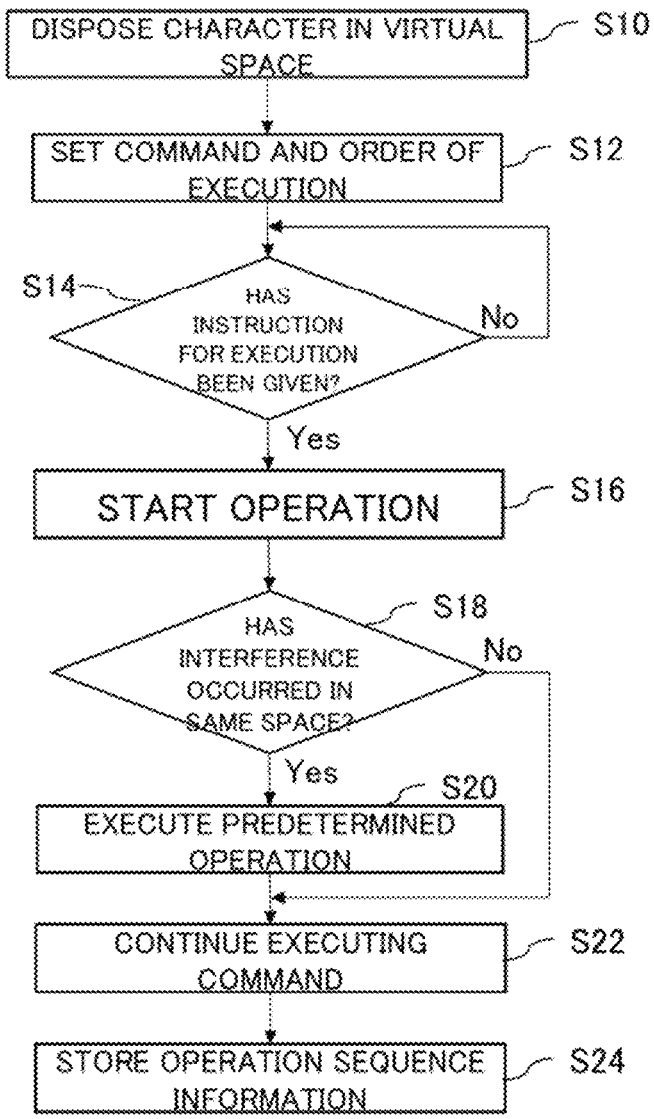
FIG. 4 is a flowchart of processing in the simulation system according to one or more aspects of the present disclosure.

FIG. 4 illustrates an example of a flow of processing in the simulation system according to one or more aspects of the disclosed subject matter.

First, the output part 20 outputs characters and/or objects to a user so that the user can perceive them, with reference to the character information storage part 220 and/or the object information storage part 225 (which indicates that, for example, the characters and/or the objects are displayed on a display part of an information terminal. The same applies hereinafter). In addition, the input part 10 receives an instruction for selecting one or more characters and/or objects to be operated in the virtual space 100 from among the output characters and/or objects from the user. In addition, the output part 20 outputs the virtual space 100 and the plurality of virtual unit spaces 110 constituting the virtual space 100 to the user so that the user can perceive them. In addition, the input part 10 receives an instruction for selecting the virtual unit space 110 for disposing the character and/or the object from among the plurality of virtual unit spaces 110 output from the user. Here, in a case where there are a plurality of characters and/or a plurality of objects, the input part 10 receives the designation of the position of the virtual unit space 110 in which the characters and/or objects are to be disposed, for every plurality of characters and/or every plurality of objects. In addition, the disposition part 12 disposes each of one or more characters and/or objects in a predetermined virtual unit space 110 in accordance with an instruction for selecting one or more characters and/or objects received by the input part 10 and the designation of the position of the virtual unit space 110 in which one or more characters and/or objects are disposed (step 10; Step will be denoted by "S" below).

Subsequently, the command setting part 14 outputs various commands stored in the command information storage part 222 to the user from the output part 20 so that the user can perceive it. The command setting part 14 sets one or more commands to be executed in the virtual space 100 and the order of execution of the commands for each of one or more characters disposed in the virtual unit space 110 in accordance with an instruction received from the user who is referred to the output commands (S12). Further, in a case where the execution reception part 16 has received the user's instruction for executing the commands through the input part 10 (Yes in S14), the operation control part 18 starts an operation of the character in accordance with the commands and the order of execution of the commands which are set for the character by the command setting part 14 (S16). On the other hand, in a case where the execution reception part 16 has not received the user's instruction for executing the commands through the input part 10, the execution reception part 16 waits until the execution instruction is received (No in S14).

Further, in a case where interference has occurred between a character that operates in the virtual space 100 in accordance with a command and another character, an object, and/or a predetermined virtual unit space 110 (Yes in S18), the operation control part 18 causes the character to execute a predetermined operation based on a relationship between the character and the other character, the object, and/or the predetermined virtual unit space 110 (S20). The operation control part 18 causes the character to execute a predetermined operation, based on operation information stored in the character interference information storage part 223, the space interference information storage part 224, and/or the object interference information storage part 226. Examples of the predetermined operation include various operations described above.

In addition, the operation control part 18 causes the character to execute an operation based on the interference and then causes the character to continue executing the commands set by the command setting part 14 (S22). Note that the operation control part 18 may cause the character to execute an operation based on the interference and then cancel the commands set by the command setting part 14 and cause the character to execute the predetermined operation. On the other hand, in a case where interference has not occurred between the character that operates in the virtual space 100 in accordance with a command and another character, an object, and/or a predetermined virtual unit space 110 (No in S18), the operation control part 18 causes the character to continue executing the commands set by the command setting part 14 (S22). In addition, the operation control part 18 configures a series of operations executed by the character in the virtual space 100 as operation sequence information and stores the operation sequence information in the operation sequence information storage part 227 (S24).

[Simulation Program]

Components included in the simulation system 1 illustrated in FIGS. 1 to 4 can be realized by causing an arithmetic processing device such as a central processing unit (CPU) to execute a program (that is, a simulation program), that is, processing of software. In addition, the components can also be realized by writing a program in advance to hardware as an electronic component such as an integrated circuit (IC). Note that software and hardware can also be used together.

The simulation program can be incorporated in advance into, for example, an IC, a ROM, or the like. In addition, the simulation program is a file in an installable format or an executable format, and can be recorded on a computer-readable recording medium such as a magnetic recording medium, an optical recording medium, or a semiconductor recording medium and provided as a computer program. A storage medium that stores the program may be a non-transitory storage medium such as a CD-ROM or a DVD. Further, it is also possible to store the simulation program in advance in a computer connected to a communication network such as the Internet so that it can be provided by being downloaded via the communication network.

The simulation program causes a CPU or the like to function as the input part 10, the disposition part 12, the command setting part 14, the execution reception part 16, the operation control part 18, the output part 20, the storage unit 22, the editing part 24, the experience value giving part 26, the hint presentation part 28, the character information storage part 220, the unit space information storage part 221, the command information storage part 222, the character interference information storage part 223, the space interference information storage part 224, the object information storage part 225, the object interference information storage part 226, and the operation sequence information storage part 227 which are described in FIGS. 1 to 4.

In the simulation system 1 according to an exemplary embodiment, a user can freely set a command for an operation of a character and the order of execution of the command with respect to the character that can operate in the virtual space 100. Further, in the simulation system 1, in a case where interference has occurred between the character and another character, an object, and/or a virtual unit space 110 in a virtual space, it is possible to cause the character to execute a predetermined operation with preference over a command set by a user. Thereby, a command set once is faithfully executed as it is in the related art, but in the simulation system 1, it is possible to cause a character to execute an operation different from a command in accordance with interaction between the character and another character or the like. Thus, according to the simulation system 1, a user can observe and enjoy a state where a character executes an operation different from a command set by himself or herself.

Further, in the simulation system 1, it is possible to cause a character to execute various unexpected operations for the user by various combinations such as a combination of one character and another character, a combination of the one character and an object, and/or a combination of the one character and a virtual unit space. Thus, in the simulation system 1, the user can enjoy simulation of an operation of a character by enjoying what kind of operation the character executes, that is, by undergoing trial and error of various combinations described above.

Further, in the simulation system 1, after the user sets commands and the order of execution of the commands and gives an instruction for executing the command, the user only has to observe an operation of a character and does not need to be involved in the movement of the character in the virtual space 100 during the execution of the command. Thus, in the simulation system 1, the operability of a character (proficiency in a user's operation of the character) is unnecessary, and it is possible to observe and enjoy an operation of the character.

Note that, for example, the simulation system 1 can execute a command in various modes such as a mode in which the simulation system 1 causes a character to execute a command in a predetermined story format, a mode in which the simulation system 1 causes one character and/or another character to execute a command in a format in which the one character and the other character play against each other, or a mode in which the simulation system 1 commands a predetermined character to execute an operation of chasing and catching a specific character at a predetermined location in the virtual space 100.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the invention is indicated by the appended claims, rather than the foregoing description.

The invention claimed is:

1. A system, comprising:
   circuitry configured to
   set one or more commands for a character that is able to be disposed in a virtual space constituted by a plurality of virtual unit spaces, and set the order of execution of commands in a case where a plurality of commands are set,
   operate the character in the virtual space based on the commands and the order of execution of the commands which are set for the character,
   set the commands and the order of execution of the commands for each of the character and another character,
   operate each of the character and the other character in the virtual space, and
   in a case where at least parts of an existence position of the character and an existence position of the other character are common, cause at least any one of the character and the other character to execute a predetermined operation different from the one or more set commands with preference over an operation based on the one or more set commands.

2. The system according to claim 1, wherein the commands include a command for moving the character without designating an arrival position, and a command for executing a predetermined operation in any one of the virtual unit spaces.

3. The system according to claim 2, wherein the circuitry is further configured to control an operation of the character based on features of the character and features of the virtual unit space corresponding to an existence position of the character.

4. The system according to claim 3, wherein the circuitry is further configured to start an operation in the virtual space based on the commands and the order of execution of the commands which are set for each of the character and the other character in accordance with a user's operation.

5. The system according to claim 4, wherein the circuitry is further configured to control an operation of at least one of the character and the other character based on at least one selected from a group consisting of a combination of the features of the character and the features of the other character, the command before the character is positioned in the same virtual unit space, and the command before the other character is positioned in the same virtual unit space.

6. The system according to claim 1, wherein the commands include a command for generating a derived object caused by the existence of the character in another virtual unit space adjacent to the virtual unit space which is the existence position of the character, and
   in a case where the character exists in the virtual unit space, and another character exists in the other virtual unit space in which the derived object is generated, the operation control part controls an operation of the other character based on the features of the other character and features of the derived object.

7. The system according to claim 6, wherein the circuitry is further configured to execute a predetermined operation in a case where it is determined that the command set by the command setting part is not able to be executed at the existence position of the character or in the virtual unit space which is a movement destination of the character.

8. The system according to claim 1, wherein the predetermined operation is based on a combination of one or more features of the character and one or more features of the other character.

9. The system according to claim 1, wherein the predetermined operation is not controlled by user input during execution.

10. The system according to claim 1, wherein the predetermined operation is an automatically determined interaction between the character and the other character.

11. A method of operating a character, the method comprising:
    setting one or more commands for a character that is able to be disposed in a virtual space constituted by a plurality of virtual unit spaces and setting the order of execution of commands in a case where a plurality of commands are set;
    operating the character in the virtual space based on the commands and the order of execution of the commands which are set for the character,
    wherein the commands and the order of execution of the commands are able to be set for each of the character and another character in the setting of the one or more commands, in the operating of the character, each of the character and the other character is operated in the virtual space, and in a case where at least parts of an existence position of the one character and an existence position of the other character are common, causing at least any one of the character and the other character to execute a predetermined operation different from the one or more set commands with preference over an operation based on the command set in the setting of the one or more commands.

12. A non-transitory computer-readable storage medium storing computer readable instructions thereon which, when executed by a computer, cause the computer to perform a method, the method comprising:

setting one or more commands for a character that is able to be disposed in a virtual space constituted by a plurality of virtual unit spaces and setting the order of execution of commands in a case where a plurality of commands are set; and an operation control function of operating the character in the virtual space based on the commands and the order of execution of the commands which are set for the character, wherein the commands and the order of execution of the commands are able to be set for each of the character and another character in the command setting function, and in the operation control function, each of the character and the other character is operated in the virtual space, and in a case where at least parts of an existence position of the one character and an existence position of the other character are common, causing at least any one of the one character and the other character to execute a predetermined operation different from the one or more set commands with preference over an operation based on the command set in the setting of the one or more commands.

13. A server, comprising:

circuitry configured to set one or more commands for a character that is able to be disposed in a virtual space constituted by a plurality of virtual unit spaces, and set the order of execution of commands in a case where a plurality of commands are set;

operate the character in the virtual space based on the commands and the order of execution of the commands which are set for the character, set the commands and the order of execution of the commands for each of the character and another character, operate each of the one character and the other character in the virtual space, and in a case where at least parts of an existence position of the character and an existence position of the other character are common, cause at least any one of the one character and the other character to execute a predetermined operation different from the one or more set commands with preference over an operation based on the one or more set commands.

\* \* \* \* \*